March 29, 1966  W. J. THOMAS, SR  3,242,889
REFRACTORY BRICKS
Filed Feb. 8, 1965  3 Sheets-Sheet 1
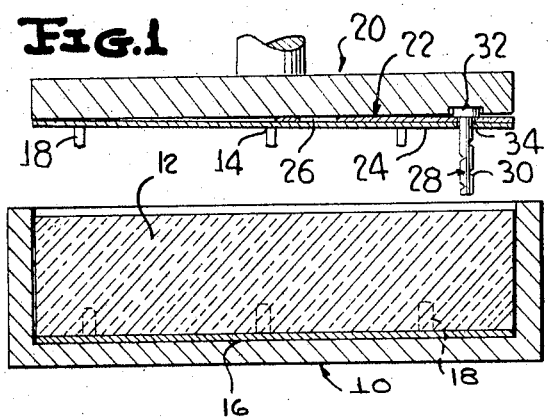
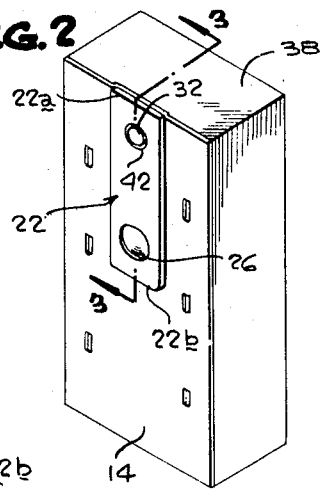
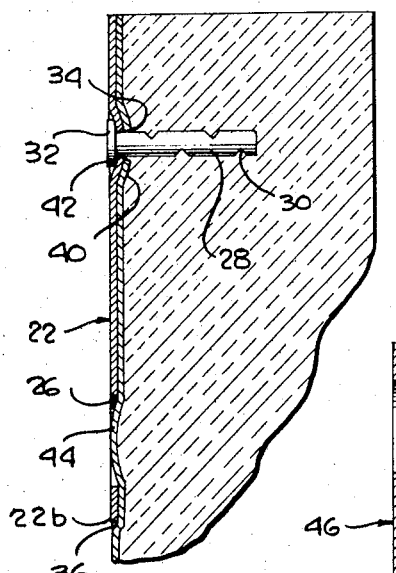
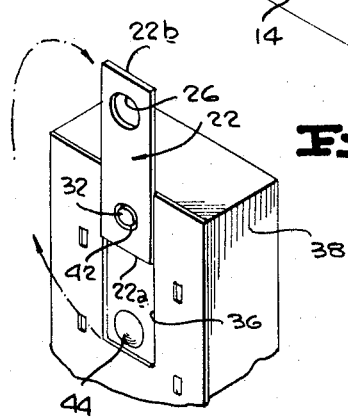
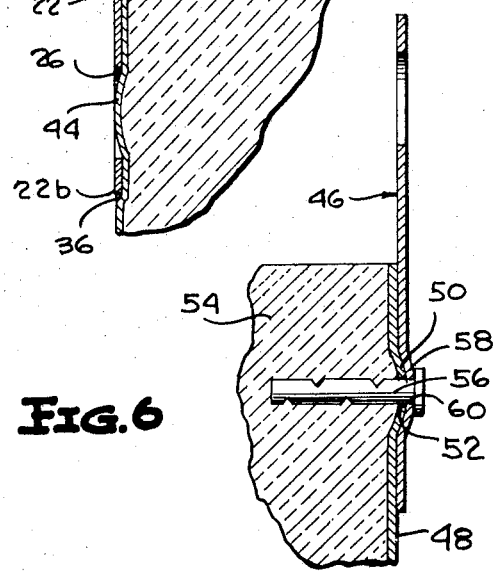
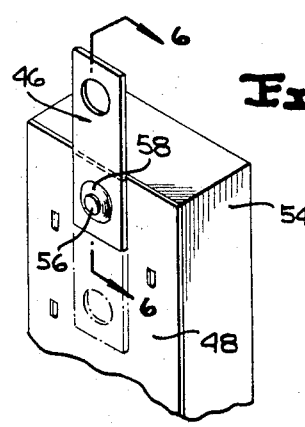
Inventor
WALTER J. THOMAS, SR.
By Shoemaker and Mattare
Attorneys March 29, 1966  W. J. THOMAS, SR  3,242,889
REFRACTORY BRICKS
Filed Feb. 8, 1965  3 Sheets-Sheet 2
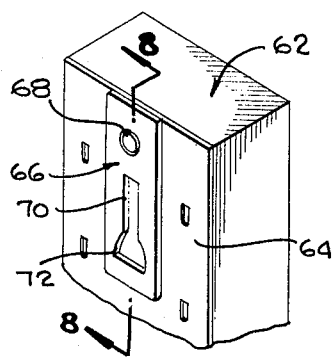
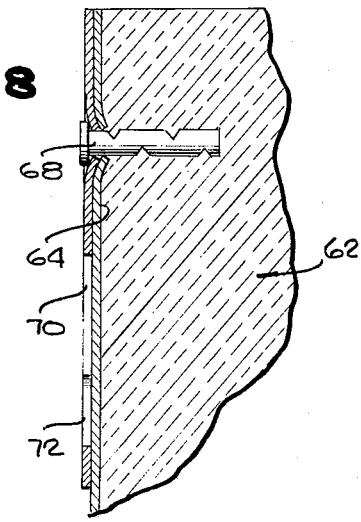
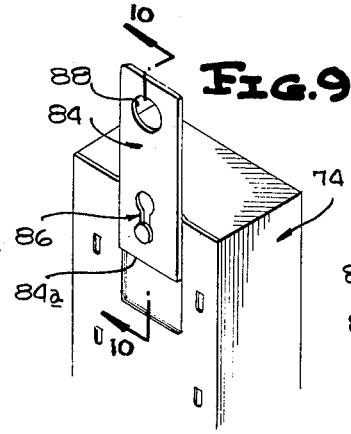
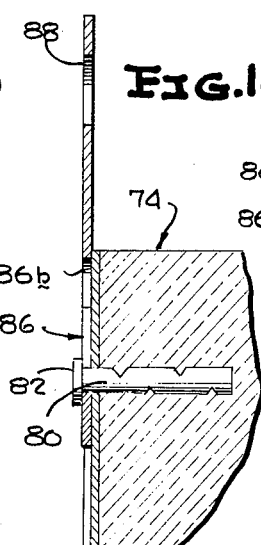
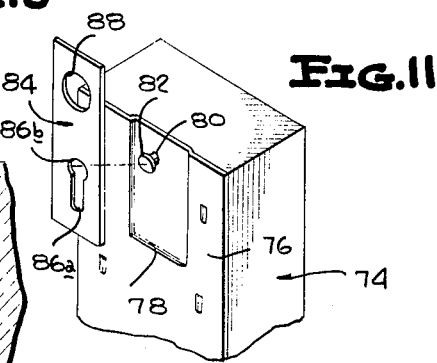
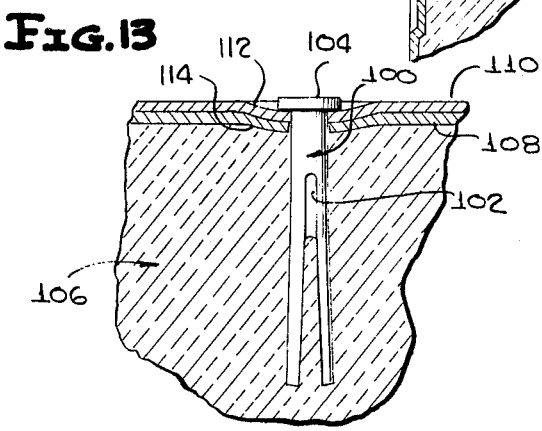
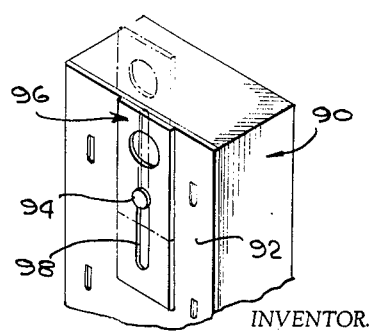
INVENTOR.
WALTER J. THOMAS, SR.
BY Shoemaker and Mattare
ATTORNEYS March 29, 1966 W. J. THOMAS, SR 3,242,889
REFRACTORY BRICKS
Filed Feb. 8, 1965 3 Sheets-Sheet 3
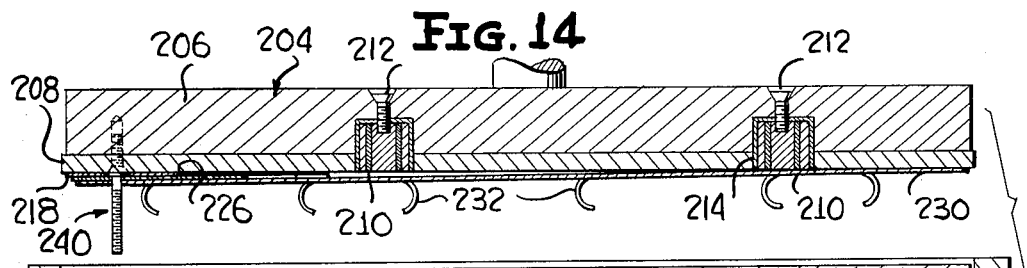
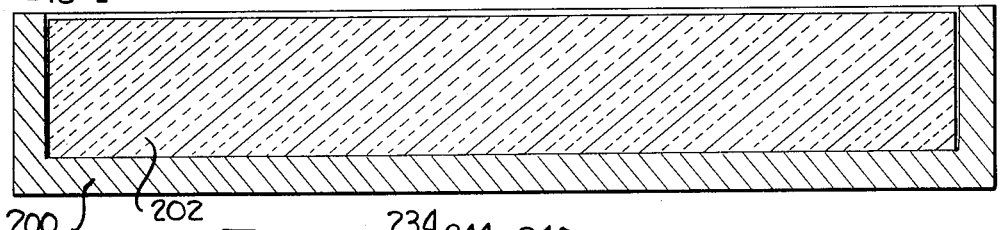
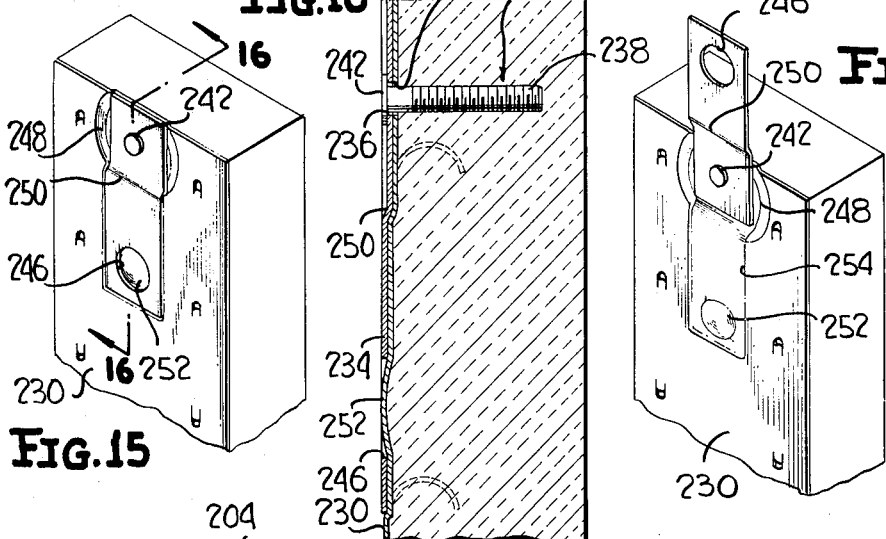
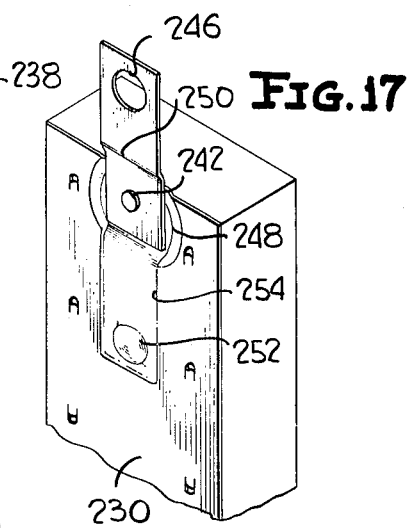
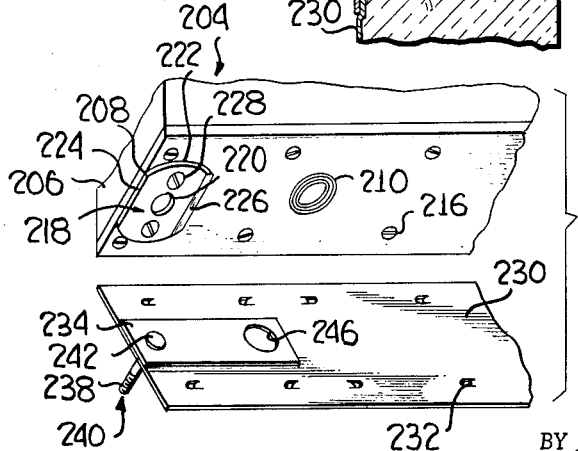
INVENTOR
WALTER J. THOMAS, SR.
BY *Shoemaker and Mattare*
ATTORNEYS

United States Patent Office 3,242,889
Patented Mar. 29, 1966

3,242,889
REFRACTORY BRICKS
Walter J. Thomas, Sr., Plymouth Meeting, Pa., assignor to E. J. Lavino and Company, Philadelphia, Pa., a corporation of Delaware
Filed Feb. 8, 1965, Ser. No. 430,865
17 Claims. (Cl. 110—99)

This application is a continuation-in-part of my application Serial No. 232,953, filed October 25, 1962, for Refractory Bricks.

This invention relates to improvements in refractory bricks, such as are employed in the construction of refractory furnace roofs and wherein such refractory bricks have comolded therewith, metallic surface plates.

Refractory bricks of the type above referred to are conventionally provided with means joined to the surface plate, for attaching the brick, in the construction of a furnace roof, to an overhead support. Such attaching means is conventionally joined, as by welding, to one of the surface plates at one end of the brick, and is in the form of a tab having a portion thereof joined to a face of the surface plate and having the remaining portion formed at an angle and embedded in the end of the brick material, whereby it is necessary that this embedded portion be bent outwardly to extend longitudinally of and from the end of the brick, when the brick is to be placed in position in the roof structure, the outwardly bent portion being formed with a suitable hole or opening for facilitating the hanging of the brick in position.

The present invention has for a particular object to provide, in association with a refractory brick having comolded metallic surface plates, an improved hanging or supporting tab which is attached to the surface plate, in a manner whereby the tab can be readily shifted by swinging or sliding, or may be readily attached to the brick, at the time of its being put into use, into operative position, without bending or otherwise deforming the supporting tab.

Another object of the invention is to provide a novel means applying a supporting tab to a refractory brick and the surface plate secured to one face of the brick, whereby the tab is anchored not only to the surface plate, but to and in the refractory material of the brick itself, so that a strong supporting connection is established between the supporting tab and the brick.

Still another object of the invention is to provide a refractory brick with a supporting tab therefor, wherein the supporting tab is securely attached to the body of the brick by a headed pin member which extends through the surface plate.

A further object is to provide a means of attaching a surface covering plate, a supporting tab and an anchoring pin to a refractory brick body in a manner whereby the pin attached end portion of the tab and adjacent portion of the plate will be inset from the plane of the outer surface of the remainder of the plate whereby the head of the anchoring pin for the tab will not project beyond the said plane of the plate and will not interfere with the placement of a side of another brick flat against the surface of the plate.

In one embodiment of the invention, the brick supporting tab is secured adjacent to one end by an anchoring pin which is driven into the refractory material of the brick and which pin has a head which engages the outer surface of the tab and when the brick is being put into position the workman merely elevates or raises the other end of the tab and rotates the tab around the pin to bring it to a position where substantially half of the tab extends beyond the adjacent end of the brick body.

In another embodiment of the invention the anchoring pin is set in the brick body with the head thereof spaced slightly from the surface of the surface or jacket plate and the supporting tab is provided, adjacent to one end thereof, with a keyhole slot whereby the inner end of the tab can be readily locked to the pin with the opposite end portion of the tab, carrying a suitable hole or opening, extending beyond the adjacent end of the brick.

It is also contemplated to provide a brick with the supporting or suspending tab retained in place by a headed pin having its shank embedded in the brick material and the head end extending through a straight slot formed in the inner end portion of the tab, which slot permits the tab to be shifted longitudinally from an inoperative to an operative position.

Other objects and advantages of the invention will become apparent as the description of the same proceeds and the invention will be best understood from a consideration of the following detailed description taken in connection with the accompanying drawings, wherein:

FIG. 1 is a view illustrating diagrammatically one procedure for attaching a suspension tab to the refractory brick by means of a notched pin and while the brick material is in the mold.

FIG. 2 is a view in perspective of a brick showing the suspension tab in the inoperative position.

FIG. 3 is a sectional view on an enlarged scale taken substantially on the line 3—3 of FIG. 2 through a portion of the brick and illustrating the manner in which the shank portion of the attaching pin is embedded and locked in the brick material.

FIG. 4 is a view in perspective of the tab end of the brick showing the tab swung into operative position.

FIG. 5 is a perspective view of the tab end of the brick showing another manner of attaching the tab and showing the tab in operative position.

FIG. 6 is a sectional view on an enlarged scale taken substantially on the line 6—6 of FIG. 5 through a portion of the brick and the attached elements.

FIG. 7 is a view in perspective of the tab end of the brick showing another form of slotted tab.

FIG. 8 is a sectional view taken substantially on the line 8—8 of FIG. 7 through a portion of the brick structure.

FIG. 9 is a view in perspective of the tab end of a brick showing the attachment of the tab by means of a keyhole slot engaging the pin.

FIG. 10 is a sectional view on an enlarged scale taken substantially on the line 10—10 of FIG. 9 through a portion of the brick.

FIG. 11 is a perspective view illustrating the separated relation of the plated brick body and the keyhole slotted tab preparatory to attaching the tab to the pin.

FIG. 12 is a view in perspective of an end of a brick and illustrating the attachment of the suspension tab by a headed pin engaging in a longitudinal slot in the tab.

FIG. 13 is a sectional detail similar to FIG. 3 and showing another style of anchoring pin.

FIG. 14 is a view corresponding to FIG. 1 and illustrating another embodiment of the invention and the manner of applying the plate, tab and pin to a refractory brick.

FIG. 15 is a view in perspective, on a smaller scale, showing the end portion of a brick with the tab, pin and plate applied in accordance with the showing of FIG. 14.

FIG. 16 is a sectional view taken substantially on the line 16—16 of FIG. 15, the view being on an enlarged scale.

FIG. 17 is a view corresponding to FIG. 15 but showing the tab swung to operative position.

FIG. 18 is a view illustrating the bottom part of the ram structure with the mold shoe applied thereto and the top or outer surface of the brick facing plate with the tab and pin assembled ready for placement against the bottom of the ram to be held in position by the magnets.

Referring now more particularly to FIGS. 1 to 3 inclusive, there is illustrated, in FIG. 1, diagrammatically, one method of fixing a tab and pin to a plated brick while the latter is in the forming mold.

In this diagrammatic figure the numeral 10 generally designates a forming mold in which there is shown the basic refractory brick material 12. The metallic surface plates to be molded therewith are designated 14 and 16.

The brick is formed by comolding the metallic plates with the refractory mix 12 and applying pressure through the plates. This is conventional procedure and also it is conventional to form the plates with struck out anchor prongs 18 which are pressed into the refractory material for establishing a locking connection between the plates and the finished brick.

The numeral 20 generally designates a ram or pressing unit which is in the form of a magnet and which may be either a fixed magnet or an electro magnet as desired. This magnet unit 20 may be supported in a suitable manner for movement toward the brick material for pressing or forming the brick and comolding the plate 14 therewith and for simultaneously affixing the tab and attaching pin in position against the plate with the pin shank extended into the body of refractory material.

The brick suspension tab, in one form thereof, is designated 22. Adjacent to one end the tab is provided with the pin receiving opening 24 while adjacent to the other end there is formed a larger opening 26 which is provided for facilitating attaching the tab to a mounting structure.

The attaching pin is designated 28.

The pin 28 is provided through its length with transverse notches 30 and at one end is headed as indicated at 32.

In applying the plate, pin and suspension tab to the brick while the latter is in the mold form, they are held above the brick material by the underside of the magnet unit, against which they are positioned as illustrated and while so held, the magnet is lowered to function as a ram for forcing the pin 28, which extends through an opening 34 in the plate, to penetrate into the refractory material 12. The force applied by the ram magnet may be such as to produce in the plate 14 an indentation as shown at 36 which is in the form of the suspension tab.

FIG. 2 shows the completed refractory brick which is here generally designated 38, as distinguished from the mass of refractory material 12 in the form 10.

As will be readily understood from the showing of FIG. 1 the attaching tab and pin are positioned by the ram magnet so that when the tab and pin are applied against the plate 14, the transverse end edge of the suspension tab adjacent to the pin will lie substantially flush with the adjacent transverse end edge of the plate 14 while the opposite end of the tab is disposed inwardly. Consequently, in the finished brick structure the complete straight tab will lie entirely against the face of the plate 14 with no part of the tab projecting beyond the end edge of the finished brick body.

For convenience of description, the end of the suspension tab 22 through which the pin 28 extends, may be defined as the secured end and is designated 22a while the opposite end, adjacent to which the opening 26 is located, may be defined as the free or unsecured end, and is designated 22b.

In addition to the formation of the shallow indentation 36 in the full length of the suspension tab 22, by the force of application of the suspension tab to the plate, it will be seen upon reference to FIG. 3 that the plate 14 around the opening 34 will be depressed as indicated at 40, and also the suspension tab around the opening 24 thereof will be depressed or dimpled inwardly as indicated at 42 and at the free end 22b of the suspension tab the middle of the plate 14 will be shaped as a shallow outwardly extending button 44, by the opening 26 of the suspension tab.

When the refractory brick 38 is to be placed in hanging position for use in the furnace structure the workman needs only to raise the free end 22b of the tab from the indentation 36, which operation can be easily accomplished due to the relative thinness and flexibility of the metal tab, and then rotate the tab around the securing pin 28 to the position illustrated in FIG. 4. Since the pin 28 is inserted into the brick adjacent to an end thereof it will be seen that a substantial portion of the tab can be positioned to extend freely from the adjacent end of the brick body. Thus with the present invention the tab is readily fixed in its straight, flat and unbent condition to the surface plate of the brick and to the body of the brick and it will remain lying through its full length against the plate 14 until it is ready for use, whereupon it can be easily shifted to the position shown in FIG. 4.

It will also be apparent that after the tab has been raised at its inner end from the depression 36 and swung to its working position as shown in FIG. 4 it will reseat itself in the outer end portion of the depression 36 and thus be held against displacement, thereby facilitating the operation of mounting the brick in position in association with other bricks of a furnace roof structure.

The top surface of the head of the pin lies substantially in the plane of the face of the tab and the surface portion of the plate 14 lying outside of the depression 36.

In FIGS. 5 and 6 there is illustrated a slight modification of the suspension tab wherein the tab, here generally designated 46, when applied against the surface of the facing plate 48 is not indented into the facing plate but bears against the surface thereof. In this form the facing plate 48 is shown slightly raised as at 50, around the pin opening 52 and the material of the refractory brick 54 becomes pressed into the underside of the raised portion 50, as shown in FIG. 6 when the tab 46 is pressed there against and the pin 56 is forced into the brick material.

The tab 46 likewise is formed with a slight outwardly projecting or raised portion 58 around the pin opening 60. Thus it will be seen that the two outwardly projecting and interengaged portions 50 and 58 of the plate 48 and 46 respectively when tightly frictionally engaged one within the other will hold the suspension tab in its initial position lying full length against the outer surface of the plate 48 and also holds the tab when it is rotated to the working position in which it is shown.

In FIGS. 7 and 8 the numeral 62 designates a refractory brick having secured to a face thereof the surface plate 64. In these figures the suspension tab is generally designated 66 and this tab is attached by the pin 68 to the body of the brick in a similar manner to the tab 22, the attaching pin 68 passing through the attached end of the tab into the brick material as illustrated in FIG. 8, but in this case the attaching tab is shown lying against the face of the plate 64.

The attaching tab 66 also differs from the tab 22 in having the elongate hanger slot 70 therein which is widened out or enlarged at the end thereof adjacent to the free end of the suspension tab, as indicated at 72.

FIGS. 9 to 11 inclusive illustrate another embodiment of the invention wherein the suspension tab is formed to be applied to the finished refractory brick, as the latter is put into use, and in this embodiment of the invention the pin and tab may be applied by the magnetic ram as hereinbefore described or the pin may be inserted through a suitable opening in the metallic surface plate and embedded in the body of the brick with the surface plate formed with or without a depression for receiving an end portion of the suspension tab, and the suspension tab formed as a separate unit to be applied to the brick as needed.

In these last mentioned figures, the numeral 74 generally designates the refractory brick having molded to the face thereof the metal surface plate 76.

The plate 76 is illustrated as having the shallow depression 78 formed therein and extending to the adjacent end edge of the plate and the brick. Adjacent to the said end edge there is fixed in the body of the brick the headed pin 80 which passes through the plate 76 in the recess area thereof and which has the underside of the head 82 spaced slightly from the surface of the plate.

Numeral 84 generally designates the suspension tab which is formed for application to the pin 80.

The tab 84 is provided with the key-hole slot 86. As shown the keyhole slot is disposed upon the longitudinal center of the tab and is located adjacent to the attached end of the tab, which end is designated 84a and is also positioned with the narrow end portion 86a of the slot nearest to the end edge 84a. The larger opening or larger end of the slot, designated 86b is of a size to have the head 82 of the pin pass therethrough while the narrow portion 86a of the slot is of a width to snugly receive the body of the pin beneath the head.

The opposite or free end of the tab is provided with an opening 88 which in this case is of circular form like the opening 26. However, it is to be understood that these openings are not limited to any specific form.

In the use of the brick and suspension tab shown in FIGS. 9 to 11, it will be apparent that when the brick is to be put into position, the workman takes the tab and inserts the head 82 of the pin through the large opening end of the keyhole slot and then pulls the tab outwardly so as to draw the pin tightly into the narrow portion of the slot. In this operation the attached end of the tab will ride in the shallow recess 78. It will also be apparent, however, that this same means of attaching the tab 84 to a brick may be employed without providing plate 76 with the depression or recess 78, in which case the tab would lie on and parallel with the surface plate.

It will be seen in FIG. 10 that the pin illustrated is the same as that shown in previous figures where the body of the pin is provided with notches to more firmly bond it in the material of the brick.

FIG. 12 illustrates still another form of the invention. In this form, the brick is generally designated 90 and the surface plate is designated 92.

The surface plate has extending therethrough and embedded in the body of the brick, the pin 94, the head of which is spaced from the surface of the plate 92 a distance approximately equal to the thickness of the suspension tab which is here generally designated 96.

In this embodiment of the invention shown in FIG. 12 the suspension tab has a straight slot 98 formed therein adjacent to the inner or attached end of the tab and in which the pin 94 is engaged. Thus it will be seen that the suspension tab is permanently attached to the brick but may be slid outwardly for use. In the application of the tab to the brick, together with the pin 94, use may be made of the magnet ram shown in FIG. 1 and described in connection with the tab 22 and pin 28.

It will also be seen that in FIG. 12 the suspension tab lies upon the surface of the plate 92. However, it may be depressed into a shallow recess if desired whereby turning or rotation of the plate on the pin 94 will be prevented when the tab is drawn outwardly for use.

FIG. 13 illustrates another form of attaching pin which may be used for connecting any one of the described suspension tabs to the brick body. This modified attaching pin is generally designated 100 and, is shown, the shank thereof is formed with the longitudinal slit 102 which opens through the inner end of the shank, while the outer end of the shank has a head 104 as in the first described pin 4.

A portion of a refractory brick is illustrated in FIG. 13 and designated 106 and there is also shown here a portion of a surface plate 108 and a portion of an overlying suspension tab 110. As illustrated in this last mentioned figure, the suspension tab and the surface plate are depressed slightly as at 112 and 114 respectively and the depression 112 receives the head 104 of the pin. However, this is only one phase of the construction and it will be readily apparent that this pin 100 may be used effectively in connection with any one of the other illustrated suspension tabs.

Referring now to FIGS. 14 to 18 inclusive, another embodiment of the invention is illustrated wherein a modified plate and tab construction is employed together with another design of magnetic ram for applying the plate, tab and pin to a brick body.

In FIG. 14 the numeral 200 generally designates the forming mold corresponding to the mold 10, in which the refractory brick material 202 is placed to receive the metal surface or cladding plate.

The ram structure, corresponding to the ram 20, is here designated 204 and may comprise a body portion 206 to the underface of which is secured the sole plate 208.

This sole plate is, of course, of proper dimensions to enter the mold 200 for compressing the refractory material 202.

The numeral 210 designates magnets which are recessed in the body 206 and secured in place by suitable means such as the screws 212. These magnets are of a type which is commercially available and embody two poles separated by a non-magnetic material as illustrated and, being commercially available, it is not believed that a more detailed description of the same is required. The magnets which may be two or more in number are disposed preferably in a longitudinal line in the body and extend through apertures 214 in the sole plate 208 and have their exposed surfaces or faces flush with the exposed face of the sole plate as illustrated.

The sole plate 208 may be attached or secured to the underface of the ram body 206 by any suitable means, the means here illustrated comprising screws 216 as shown in FIG. 18.

Fixed to the face of the sole plate 208 at one end thereof is a heel plate 218. This heel plate has an aperture 220 therein which is located on the longitudinal center line of the sole plate.

Opposite sides of the heel plate 218 are curved as indicated at 222. These curved sides are formed on the same arc struck from the center of the opening 220 and at the adjacent end edge of the sole plate they intersect the straight edge 224 which is flush with the adjacent transverse edge of the sole plate, and at their opposite ends they intersect a straight bevel edge 226 which is parallel with the edge 224 as shown.

The heel plate 218 may be attached to the face of the sole plate by welding or other means, the means here illustrated being the screws 228.

The face plate or surfacing plate to be applied to the refractory brick is generally designated 230. This plate is formed with a series of curved prongs or anchors 232 which are struck from the plate as shown and which may be placed in any desired arrangement. In the arrangement here shown the prongs are disposed in two longitudinal lines and are forced into the refractory material by means of the ram 204 in the same manner as the prongs 18 carried by the hereinbefore described plate 14.

The hanger tab to be attached to the plate 230 is designated 234 and is in the form, initially, of a straight flat strip as shown in FIG. 18.

Adjacent to one end the tab 234 is provided with a suitable opening 236 to receive the shank portion 238 of the anchor pin 240 which has a flat head 242. The opening 236 is somewhat larger than the shank of the anchor pin whereby the pin shank can be easily dropped through the opening and will remain perpendicular to the tab and to the plate 230, the plate 230 also having the opening 244 therein to receive the pin shank as shown in FIGS. 14, 16 and 18.

The centers of the openings 236 and 244 in the tab and in the plate 230 respectively are spaced the same distance from the transverse end edges respectively of the plate and of one end of the tab so that when the tab is placed in its initial or starting position against the outer face of the plate 230 as shown in FIG. 18 the transverse end edges of the plate and tab will be flush with one another.

The center of the opening 220 in the heel plate is spaced the same distance from the edge 224 of the heel plate as the centers of the openings 236 and 244 are spaced respectively from the tab and face plate 230.

The end of the tab 234 opposite from the pin 240 has the relatively large opening 246 formed therein to facilitate the hanging of the brick when the tab is rotated to its outwardly extended or operative position as shown in FIG. 17.

In the operation of comolding the plate 230 with the brick, the face plate 230, the suspension tab 234 and the pin 240 are assembled as illustrated in FIG. 18 and placed against the pressure face of the sole plate 208 with the head 242 of the pin located in the aperture or opening 220 of the heel plate as illustrated in FIG. 14.

The magnets 210 will hold these parts in assembled relation, such parts being formed of steel and accordingly readily attracted by the magnet.

It will be seen upon reference to FIG. 18 that the width of the heel plate 218 is greater than the width of the tab whereby the portions of the heel plate which extend beyond the ends of the parallel edges 224 and 226 will project beyond the sides of the tab, the length of these parallel edges being approximately the same as the width of the tab.

With the assembly secured to the face of the ram, when the ram is lowered to press the brick material and to force the prongs 232 thereinto and also to force the pin into the brick material together with the face plate 230, the heel plate 218 will form a depression or recess in the face plate as indicated at 248 and the end of the tab through which the anchor pin 240 extends, will likewise be bent or depressed into the recess, the beveled edge 226 of the heel plate bending the tab along the transverse line as indicated at 250.

The head 242 of the anchor pin will, of course, remain with the underside resting against the surface of the tab but the top surface of the head will be substantially in the same plane as the face or outer surface of the plate 230 in the area lying outside of the recess 248.

It will be seen from the foregoing that the rounded outer edge portions 222 of the heel plate in forming the corresponding rounded sides of the recess 248, will provide clearance for the corners of the tab for turning or rotating the tab from the inwardly projecting or extending position shown in FIG. 15 to the outwardly extending or projecting operative position shown in FIG. 17. Also, the body of the tab in the portion lying between the transverse bend 250 and the end having the aperture 246 therein, will also be pressed into the face of the plate 230 whereas a small portion of the plate 230 will be caused to bulge outwardly into the opening 246 forming the button 252.

The longitudinal recess or depression which the pressure applied to the inner end portion of the tab causes the tab to form in the face plate 230, is designated 254.

From the foregoing it will be apparent that there is provided by the present invention a new and novel refractory brick structure and suspension means therefor wherein, in order to put the brick into use, no bending or other physical deformation of the suspension tab is required. The tab in all instances is made as a straight strip of metal and lies against a face of the surface plate and is readily shifted either by longitudinal sliding or by rotation in a plane parallel with the surface plate, to bring a substantial free end portion of the tab into a position where it projects beyond the adjacent end of the brick, where it is ready for instant use.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A refractory brick structure and suspension means therefor, said brick structure comprising a body of refractory material having a surface plate comolded in a side thereof and being of generally rectangular form, an elongate strip of material forming a suspension tab positioned exteriorly of and upon one side of said structure, and means embedded in and bonded to the refractory material and coupling the said tab with said structure for movement of the tab in a parallel plane with said side of the brick structure to bring a substantial portion of the tab into a position of projection beyond an adjacent end of the structure, for use, said means embedded in the refractory material comprising a headed pin having a shank extending through the tab and said surface plate into the material and having the head engaged against the outer side of the tab.

2. As a new combination in a refractory brick, a brick body, a surface plate comolded in a side of the body, a headed pin extending through said plate into and bonded to the refractory material of the brick adjacent to one end of the latter, an elongate strip of metal forming a suspension tab positioned against the outer face of said plate and having an opening therethrough and adjacent to one end thereof, through which the pin extends, the head of said pin projecting beyond the outer surface of the plate and having an underside engaging the side of said tab remote from the said plate and functioning to hold the tab attached to the plate while permitting the tab to be shifted bodily in a plane paralleling the plate, from a nonworking position to a working position, and said tab having means adjacent to its other end for facilitating its attachment, when in said working position, to a support.

3. The invention according to claim 2, wherein the tab is located within the area defined by the periphery of said plate, when the tab is in the said nonworking position.

4. The invention according to claim 2, wherein said tab when shifted in said plane turns in an arc on the axis of said pin.

5. The invention according to claim 2, wherein the said opening is in the form of a slot extending longitudinally of the tab, and the tab when shifted moves longitudinally.

6. The invention according to claim 5, wherein said slot has the contour of a key hole positioned with the smaller end thereof nearest to the attached end of the tab when the tab is in working position and said slot permitting manual attachment of the tab to and its detachment from the headed pin.

7. A refractory brick and suspension tab, comprising a substantially rectangular brick body of refractory material, a surface plate secured to one side of the body and having an opening therethrough adjacent to one end of the body, an elongate flat suspension tab lying against said plate and extending lengthwise of the brick, the tab having an opening therein coinciding with said plate opening, and a headed tab attaching pin extending through said tab and plate openings into the refractory brick material, with means locking the pin in and bonding it to said material.

8. The invention according to claim 7, wherein the said pin locking means consists of notches or recesses formed transversely of the pin and in which the refractory brick is engaged.

9. The invention according to claim 7, wherein the said means locking the pin in the brick material consists of a slot formed longitudinally of the pin from the inner end thereof and having a part of the refractory brick material engaged in the slot.

10. A refractory brick structure and suspension means therefor, comprising a body of refractory material, a cladding plate bonded to one side thereof, a pin having a shank portion and a head on one end thereof, said pin shank portion extending through an aperture in the plate and into the material of the body adjacent to an end of the body and being formed to have a bonded interlocking attachment to and in the body material, the pin when so attached having the head thereof spaced from the outer surface of the plate, an elongate suspension tab positioned against the said outer surface of the plate at one end of the latter adjacent to the said one end of the body and lying parallel throughout its length with said plate surface, and said tab having an opening therethrough and having the pin shank extending through such opening and the head of the pin bridging said opening and engaging the outer surface of the tab, whereby the tab is maintained for movement on the pin relative to the body for extension of a portion of the tab beyond the said end of the body.

11. The invention as defined in claim 10, wherein the said body of material is a single solid unit.

12. The invention as defined by claim 10, wherein said plate and tab have integral portions encircling the pin and rotatably engaged one within the other.

13. The invention as defined by claim 10, with means forming an interengagement between the end of the tab remote from said pin and said plate, when the tab is moved on the pin to a position opposite to the said position in which it extends beyond the said end of the body.

14. As a new combination in a refractory brick, a brick body, a surface plate comoled in a side of the body, a headed pin extending through said plate into and bonded to the refractory material of the brick adjacent to one end of the latter, an elongate, flat metal suspension tab positioned against the outer face of said plate and having an opening therethrough and adjacent to one end thereof, through which the pin extends, the head of said pin projecting beyond the outer surface of the plate and having an underside engaging the side of said tab remote from the said plate and functioning to hold the tab attached to the plate while permitting the tab to be shifted bodily in a plane paralleling the plate, from a nonworking position to a working position, said tab being formed adjacent to its other end for attachment, when in said working position to a support, the said tab being located within the area defined by the periphery of said plate, when the tab is in the said nonworking position, and the plate having a shallow surface recess in which said tab is, at least in part, positioned.

15. A refractory brick structure and suspension means therefor, comprising a body of refractory material, a cladding plate bonded to one side thereof, a pin having a shank portion and a head on one end thereof, said pin shank portion extending through an aperture in the plate and into the material of the body adjacent to an end of the body and being formed to have a bonded interlocking attachment to and in the body material, the pin when so attached having the head thereof spaced from the outer surface of the plate, an elongate suspension tab positioned against the said outer surface of the plate at one end of the latter adjacent to the said one end of the body and lying parallel throughout its length with said plate surface, and said tab having an opening therethrough and having the pin shank extending through such opening and the head of the pin bridging said opening and engaging the outer surface of the tab, whereby the tab is maintained for movement on the pin relative to the body for extension of a portion of the tab beyond the said end of the body, said plate having a circular area offset from the plane thereof and surrounding the aperture in the plate and the offset area having a convex side and a concave side, and said tab has a corresponding circular area offset from the plane thereof and surrounding the opening in the tab and having a convex side and a concave side and the convex side of one of said offset areas lying in the concave side of the other offset area for relative rotation one within the other.

16. A refractory brick structure and suspension means therefor, comprising a body of refractory material, a cladding plate bonded to one side thereof, a pin having a shank portion and a head on one end thereof, said pin shank portion extending through an aperture in the plate and into the material of the body adjacent to an end of the body and being formed to have a bonded interlocking attachment to and in the body material, the pin when so attached having the head thereof spaced from the outer surface of the plate, an elongate suspension tab positioned against the said outer surface of the plate at one end of the latter adjacent to the said one end of the body and lying parallel throughout its length with said plate surface, and said tab having an opening therethrough and having the pin shank extending through such opening and the head of the pin bridging said opening and engaging the outer surface of the tab, whereby the tab is maintained for movement on the pin relative to the body for extension of a portion of the tab beyond the said end of the body, said means forming an interengagement between the end of the tab remote from said pin and said plate, when the tab is moved on the pin to a position opposite to the said position in which it extends beyond the said end of the body, the said interengagement means comprising an outwardly projecting button portion of the plate engaged in an aperture in the tab.

17. A refractory brick, comprising a body of refractory material having sides and ends, a face plate secured to one of said sides, said face plate having a portion thereof adjacent to one end inset into the body of the brick, forming an outwardly opening recess, said plate having a transverse end edge portion forming a border portion of the recess, the recess having an opposite border portion spaced from said one border portion in the longitudinal direction of the plate and having transversely spaced outwardly bowed side border portions, a pin having a shank and a head, the pin shank extending through the face plate in the approximate center of said recess with the head thereof spaced from the surface of the recess, and a hanger tab comprising an elongate strip of metal having two parallel terminal portions offset one from the other, one terminal portion lying in said recess and having the shank of the pin extending therethrough and the head of the pin engaging the outer side thereof, the said one terminal portion being adapted to turn in the recess on the pin shank to move the other terminal portion from an inoperative position in which it extends toward the remote end of the face plate and overlies the surface of the face plate, to an operative position in which it projects in the opposite direction beyond the said one end of the face plate, the said tab having an aperture therein adjacent to the end thereof remote from said pin, and the recess being of a width between said outwardly bowed portions materially greater than the width of the said terminal portion of the tab lying therein.

References Cited by the Examiner
UNITED STATES PATENTS

| | | | |
|---|---|---|---|
| 986,701 | 3/1911 | Frerichs | 25—102 |
| 1,350,764 | 8/1920 | Wood | 25—102 |
| 1,523,195 | 1/1925 | Harrington | 85—21 |
| 1,729,721 | 10/1929 | Hogan | 248—28 X |
| 2,488,581 | 11/1949 | Cherry et al. | 25—83 |

(Other references on following page)

UNITED STATES PATENTS

| | | | |
|---|---|---|---|
| 2,512,275 | 6/1950 | Hawk | 25—83 |
| 2,566,636 | 9/1951 | Renholts | 264—274 |
| 2,814,835 | 12/1957 | Faulkner | 264—274 |
| 2,819,641 | 1/1958 | Corckran | 85—21 |
| 2,991,736 | 7/1961 | Kivala et al. | 110—99 |
| 3,034,457 | 5/1962 | Heuer | 110—99 |
| 3,051,101 | 8/1962 | Heuer | 110—99 |

FOREIGN PATENTS

| | | |
|---|---|---|
| 607,219 | 10/1960 | Canada. |
| 70,691 | 8/1893 | Germany. |
| 862,095 | 3/1961 | Great Britain. |

FREDERICK L. MATTESON, Jr., *Primary Examiner.*

ROBERT A. DUA, *Assistant Examiner.*